(12) United States Patent
Amon et al.

(10) Patent No.: US 11,591,811 B2
(45) Date of Patent: Feb. 28, 2023

(54) CLIMBING FORMWORK AND METHOD FOR ERECTION OF A CONCRETE STRUCTURE

(71) Applicant: DOKA GMBH, Amstetten (AT)

(72) Inventors: Peter Amon, Amstetten (AT); Hermann Stift, Amstetten (AT); Simon Vogl, Linz (AT); Friedrich Steininger, Leonding (AT)

(73) Assignee: DOKA GMBH, Amstetten (AT)

( * ) Notice: Subject to any disclaimer, the term of this patent is extended or adjusted under 35 U.S.C. 154(b) by 451 days.

(21) Appl. No.: 16/754,721

(22) PCT Filed: Oct. 10, 2018

(86) PCT No.: PCT/EP2018/077605
§ 371 (c)(1),
(2) Date: Apr. 8, 2020

(87) PCT Pub. No.: WO2019/072919
PCT Pub. Date: Apr. 18, 2019

(65) Prior Publication Data
US 2020/0299977 A1   Sep. 24, 2020

(30) Foreign Application Priority Data

Oct. 10, 2017   (EP) .................................... 17195720

(51) Int. Cl.
*E04G 11/28*    (2006.01)
*E04G 11/22*    (2006.01)
*G01C 9/00*     (2006.01)

(52) U.S. Cl.
CPC .............. *E04G 11/28* (2013.01); *E04G 11/22* (2013.01); *G01C 9/00* (2013.01)

(58) Field of Classification Search
CPC ......... E04G 11/20; E04G 11/22; E04G 11/28; E04G 11/30; E04G 11/32; E04G 2011/067; G01C 9/00
See application file for complete search history.

(56) References Cited

U.S. PATENT DOCUMENTS 4,060,358 A  *  11/1977  Fougea ................... E04G 3/243
                                                       249/20
4,147,483 A  *   4/1979  Rovera ................... E04G 11/28
                                                       249/20

(Continued)

FOREIGN PATENT DOCUMENTS

| CA | 2870412 A1 * | 5/2015 | ............ E04G 11/28 |
| CN | 109469319 A * | 3/2019 | ............ E04G 11/28 |

(Continued)

OTHER PUBLICATIONS

European Patent Office, Extended European Search Report Issued in Application No. 17195720.2, dated Mar. 27, 2018, Germany, 5 pages.

(Continued)

*Primary Examiner* — Michael Safavi
(74) *Attorney, Agent, or Firm* — McCoy Russell LLP

(57) ABSTRACT

A formwork and method for casting a concrete structure comprising: a first form element for delimiting a cavity to receive concrete, the first form element having an upper end and a lower end, a first tilt sensor for measuring an actual tilt of the first form element,
the first tilt sensor further comprising a first sensor element for measuring the inclination of a lower region of the first longitudinal element and a second sensor element for measuring the inclination of an upper region of the first longitudinal element, and determining a deviation between the (Continued)

inclination of the lower region of the first longitudinal element and the upper region of the first longitudinal element.

18 Claims, 4 Drawing Sheets

(56) References Cited

U.S. PATENT DOCUMENTS

| | | | | |
|---|---|---|---|---|
| 4,530,648 | A * | 7/1985 | Phillips | E04G 11/28 249/20 |
| 5,841,353 | A * | 11/1998 | Chisholm | G01S 19/53 33/366.11 |
| 6,557,817 | B2 * | 5/2003 | Waldschmitt | E04G 11/28 249/19 |
| 8,673,189 | B2 * | 3/2014 | Schwoerer | E04G 11/28 249/20 |
| 2009/0041879 | A1 | 2/2009 | Baum et al. | |
| 2010/0038518 | A1 | 2/2010 | Schwoerer | |
| 2013/0341813 | A1 * | 12/2013 | Baum | E04G 11/28 264/33 |
| 2017/0254100 | A1 * | 9/2017 | Baum | E04G 11/20 |

FOREIGN PATENT DOCUMENTS

| | | | | | |
|---|---|---|---|---|---|
| CN | 110388048 | A | * | 10/2019 | E04G 11/28 |
| DE | 805312 | C | * | 5/1951 | E04G 11/28 |
| DE | 870023 | C | * | 3/1953 | E04G 11/28 |
| DE | 2402683 | A1 | * | 7/1975 | E04G 11/28 |
| DE | 2921636 | A | * | 12/1980 | B66F 1/08 |
| DE | 3006491 | A1 | * | 8/1981 | E04G 11/28 |
| DE | 102018123405 | A1 | * | 3/2020 | E04G 11/28 |
| DE | 102019108782 | A1 | * | 10/2020 | G01C 9/00 |
| EP | 0373617 | A2 | * | 6/1990 | E04G 11/28 |
| EP | 3228776 | A1 | * | 10/2017 | E04G 11/28 |
| EP | 3228776 | A1 | | 10/2017 | |
| EP | 3241959 | A1 | * | 11/2017 | E04B 2/84 |
| FR | 55947 | E | * | 9/1952 | E04G 11/28 |
| FR | 2487410 | A1 | * | 1/1982 | E04G 11/28 |
| GB | 1536014 | A | * | 12/1978 | E04G 11/28 |
| JP | 2000314235 | A | | 11/2000 | |
| WO | WO-2007141264 | A1 | * | 12/2007 | E04G 11/28 |
| WO | 2011127970 | A1 | | 10/2011 | |
| WO | 2013110126 | A1 | | 8/2013 | |

OTHER PUBLICATIONS

ISA European Patent Office, International Search Repod and Written Opinion Issued in Application No. PCT/EP2018/077605, WIPO, 8 pages.

* cited by examiner

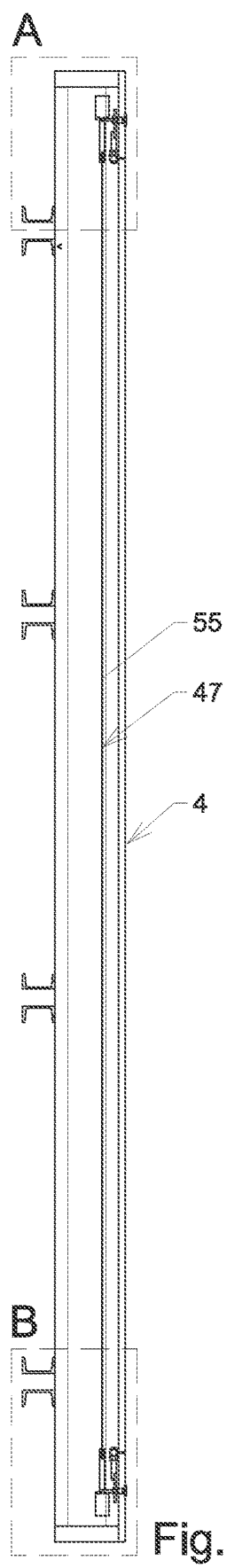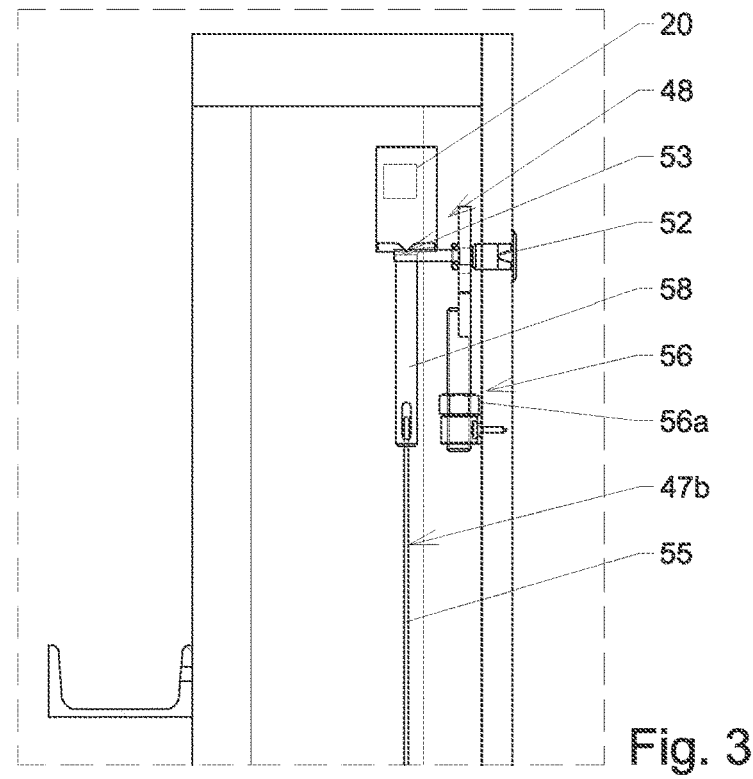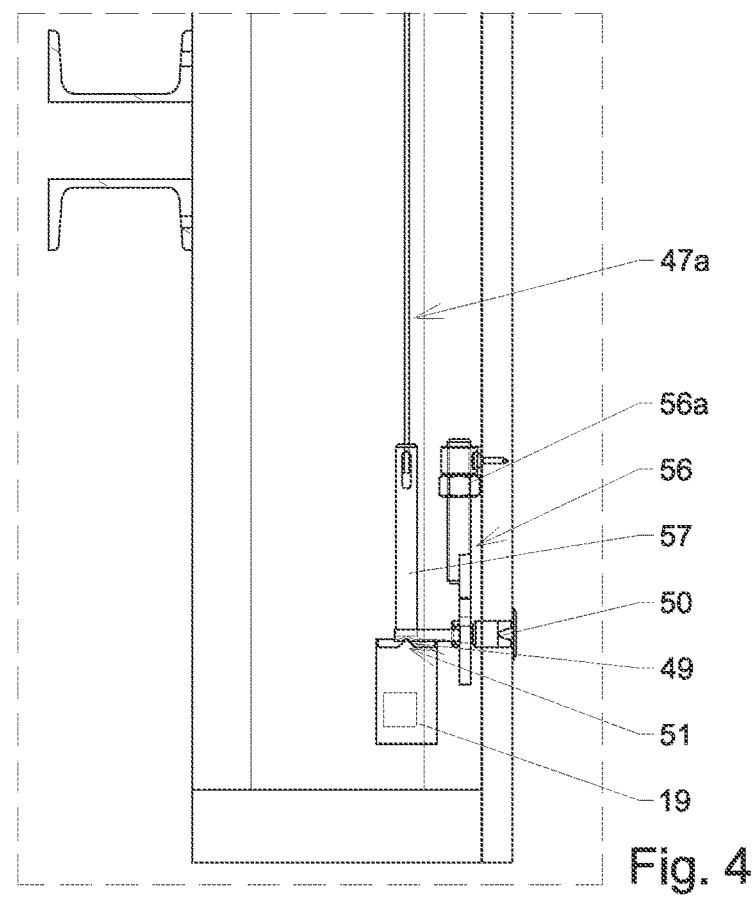

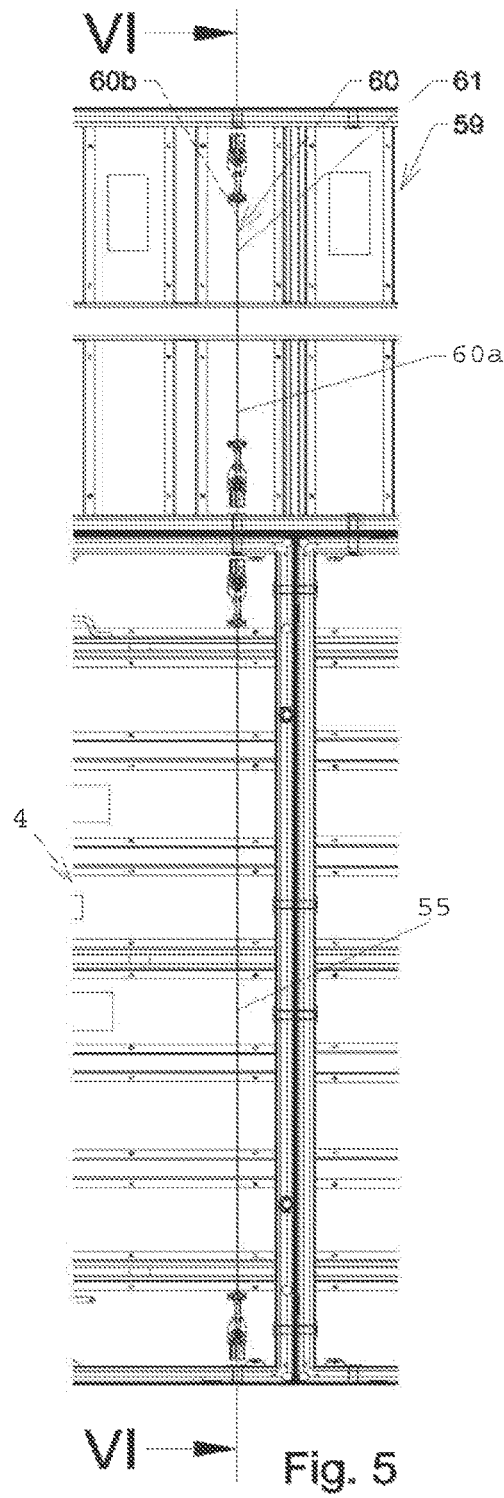
Fig. 5
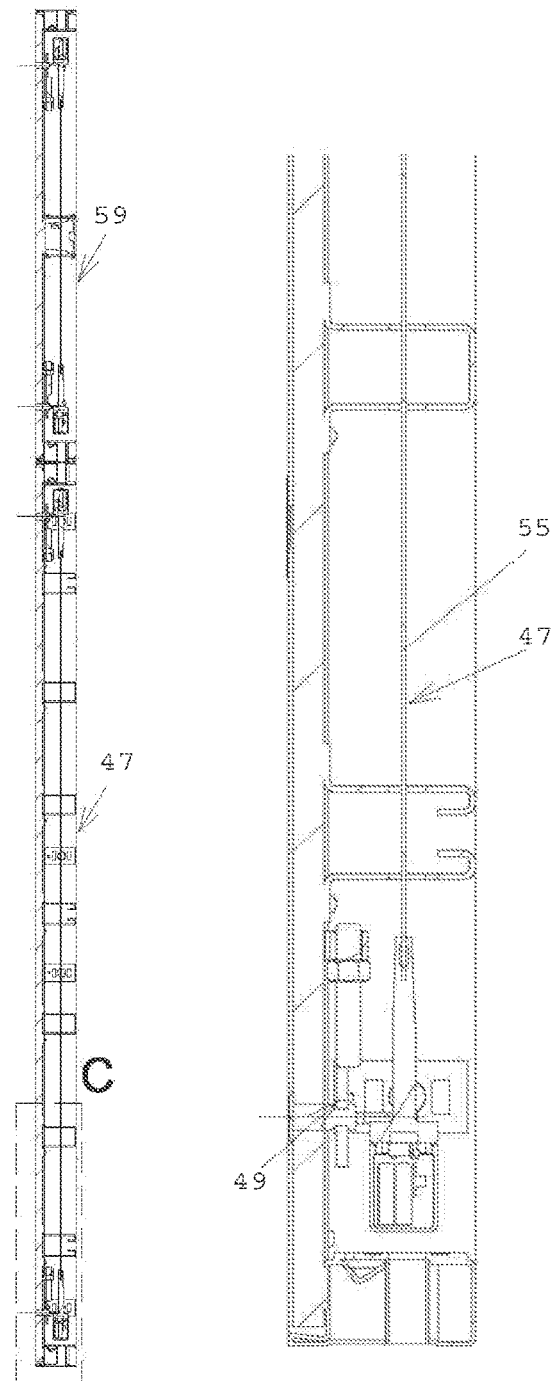
Fig. 6
Fig. 7

CLIMBING FORMWORK AND METHOD FOR ERECTION OF A CONCRETE STRUCTURE

CROSS-REFERENCE TO RELATED APPLICATIONS

The present application is a U.S. National Phase of International Patent Application Serial No. PCT/EP2018/077605 entitled "FORMWORK AND METHOD FOR ERECTION OF A CONCRETE STRUCTURE," filed on Oct. 10, 2018. International Patent Application Serial No. PCT/EP2018/077605 claims priority to European Patent Application No. 17195720.2 filed on Oct. 10, 2017. The entire contents of each of the above-referenced applications are hereby incorporated by reference for all purposes.

TECHNICAL FIELD

The present invention relates to a formwork for casting a concrete structure, the formwork comprising
- at least a first form element for delimiting a cavity to receive concrete, the first form element having an upper end and a lower end,
- a first tilt sensor for measuring an actual tilt of the first form element,
- a processing unit communicating with the first tilt sensor.

BACKGROUND AND SUMMARY

In the prior art, climbing formworks are used to erect a concrete structure, for example a skyscraper, in a number of successive casting steps. Such climbing formworks may be relocated between casting steps or can move upwards on their own. The latter type is usually referred to as a self-climbing formwork. Examples are shown in US 2010/0038518 A1 or WO 2013/110126 A1.

Another type of climbing formwork is disclosed in WO 2011/127970. In this prior art, the tilting of the formwork is controlled by an angle adjuster unit.

However, in the prior art the adjustment of the tilting angle of the formwork was done with limited precision. For this reason, it was difficult to bring the formwork into a casting position that accurately compensates for deviations from the building plan that occurred in previous casting segments.

EP 3 228 776—which is published after the instant invention—discloses a climbing formwork with an improved tilt sensor having a longitudinal element, in particular a tensioned string, attached to the upper and lower end of the form element, respectively. The inclination of the longitudinal element is reflective of the inclination of the form element. A single sensor element is arranged at the lower end of the longitudinal element to measure the inclination of the longitudinal element.

It is therefore an object of the invention to alleviate some or all of the drawbacks of the prior art and to propose a formwork and a method for casting a concrete structure that facilitates adjustment of the tilt of the formwork before casting.

This object is met by providing a formwork with the features of claim 1 and a method with the steps of claim 15.

Thus, in the formwork of the instant invention
the first tilt sensor comprises a first longitudinal element mounted on the first form element, the first longitudinal element extending from an upper region of the first form element to a lower region of the first form element, the first longitudinal element being connected to the first form element at the upper region and at the lower region of the first form element, respectively,
the first tilt sensor further comprising a first sensor element for measuring the inclination of a lower region of the first longitudinal element and a second sensor element for measuring the inclination of an upper region of the first longitudinal element,
the processing unit further being arranged for determining a deviation between the inclination of the lower region of the first longitudinal element and the upper region of the first longitudinal element.

For bringing the first form element into a casting position, the first form element is tiltable and movable at least in a horizontal direction. The first form element may be attached to a first support structure. The first support structure may be arranged for supporting the first form element from below or for suspending the first form element from above. Preferably, the first support structure comprises a working platform. In the invention, the first tilt sensor is adapted for measuring the tilt, i.e. the inclination with respect to a vertical plane, of the first form element. In the preparation of the present casting step, the first form element may be moved into a casting position, in which the lower end of the first form element may be brought into contact with the upper end of the casting segment of the previous casting step. The construction of the tilt sensor according to the invention is particularly advantageous in that the accuracy of the measurement of the inclination of the first form element is significantly increased. In many cases, the shape of the first form element may only be provided with limited precision. In such cases, measuring the tilt of the first form element at an arbitrary position along the length of the first form element would not yield reliable results. In the invention, this problem can be avoided by connecting the first longitudinal element to the first form element at two positions vertically spaced apart from one another, preferably at the upper and the lower end of the first form element. In this case, deformations of the first form element are less detrimental to the tilt measurements. Furthermore, the first and second sensor element is provided for measuring the inclination of the lower and upper region of the first longitudinal element, respectively. In this way, an involuntary deflection of the first longitudinal element may be detected by means of a deviation between the measurements of the first and second sensor element. Such deflections of the first longitudinal element may have a variety of causes. For example, workers may lean tools against the first form element in the vicinity of the first longitudinal element. Also, nails inserted into the first form element could collide with the first longitudinal element. Due to the measurements of the inclination at vertically spaced regions of the first longitudinal element and the detection of a deviation between the measurements, the longitudinal element may be arranged without a housing surrounding the longitudinal element, i.e. in a state exposed to the working environment. This greatly reduces the size of the tilt sensor in a disassembled state for transport. Thus, the tilt sensor may be easily transported to any construction site for mounting on the first form element.

The tilt sensor preferably is deployed in a climbing formwork for erection of a concrete structure by successively casting a plurality of casting segments. The casting segments may be walls superimposed on each other.

Preferably, the first sensor element is arranged for measuring the inclination of a lower end of the first longitudinal element and the second sensor element is arranged for measuring the inclination of an upper end of the first longitudinal element. Thus, the two opposite ends of the first longitudinal element are monitored with the first and second sensor element, respectively. This construction achieves great accuracy in the adjustment of the tilting angle of the first form element.

For the purposes of the present disclosure, the positional and directional indications, like "lower", "upper", refer to the arrangement of the formwork in use when casting an essentially vertical concrete structure. However, the formwork of the present invention may likewise be used for casting inclined concrete structures or horizontal concrete structures, such as floors. In the latter case, the positional and directional indications apply with the necessary changes being made.

In a preferred embodiment, the first longitudinal element has but two connections to the first form element, preferably an upper connection at the upper end and a lower connection at the lower end of the first form element, respectively.

In another preferred embodiment, the processing unit is connected to at least one of
 a displaying device for displaying the deviation between the inclination of the lower region of the first longitudinal element and the upper region of the first longitudinal element,
 a signaling device for signaling the deviation between the inclination of the lower region of the first longitudinal element and the upper region of the first longitudinal element.

For example, if the deviation exceeds a certain threshold stored in a data storage of the processing unit, at least one of the following actions are taken:
a) The displaying device shows the deviation measured by the first sensor element and the second sensor element, respectively.
b) The signaling device gives an alarm, for example an acoustic or visual alarm.
c) The adjustment of the first form element is interrupted.

In another preferred embodiment, the first longitudinal element is connected to the first form element via a first pivoting support at the lower region of the first form element and a second pivoting support at the upper region of the first form element, respectively. In this embodiment the first longitudinal element is supported, preferably on opposite ends, by a first pivoting or tilting support and a second pivoting or tilting support. In this way, the arrangement of the first longitudinal element accurately reflects the inclination of the first form element. The (first and/or second) pivoting support may have a pointed support and a recess for the pointed support.

In another preferred embodiment, the formwork provides for
 a first bracket attached to the first form element at the lower region thereof, the first bracket being connected to the first pivoting support for pivotably supporting the lower region of the first longitudinal element and/or
 a second bracket attached to the first form element at the upper region thereof, the second bracket being connected to the second pivoting support for pivotably supporting the upper region of the first longitudinal element.

In another preferred embodiment, the first longitudinal element, in a disassembled state of the tilt sensor for transport, is flexible. This greatly facilitates transport of the tilt sensor.

Preferably, the first longitudinal element is a wire or string. This variant is particularly light-weight and reliable. Furthermore, this tilt sensor is particularly compact during transport.

In this embodiment, the tilt sensor preferably further comprises a tensioning device for putting the wire or string under tension. In this way, the inclination of the first longitudinal element may be measured with increased accuracy.

In another preferred embodiment, the formwork provides for
 an extension form element connected to the upper end of the first form element and extending upwards therefrom,
 a second longitudinal element extending from an upper region of the extension form element to a lower region of the extension form element, wherein
 the tilt sensor further comprises a third sensor element arranged for measuring the inclination of a lower region of the second longitudinal element and a fourth sensor element for measuring the inclination of an upper region of the second longitudinal element,
 the processing unit further being arranged for determining a deviation between the inclination of the lower region of the second longitudinal element and the upper region of the second longitudinal element.

In this embodiment, the first form element and the extension form element constitute a framed formwork, as is per se known in the prior art. The framed formwork preferably is made of metal or plastic material. A suitable combination of (extension) form elements is used to achieve the desired dimensions of the framed formwork. The first form element at the upper end thereof and/or the extension form element at the lower end thereof may have a transverse rib. Such rib would prevent the arrangement of the first longitudinal element over the total vertical extension of the framed formwork within the width of the framed formwork. In the preferred embodiment disclosed herein, a second longitudinal element (separate from the first longitudinal element) is arranged at the extension form element. The construction of the second longitudinal element, its attachment to the extension form element and the possible responses to the measured deviation between the inclination of the lower region of the second longitudinal element and the upper region of the second longitudinal element may be identical to the first longitudinal element so that reference is made to the disclosure above.

In another preferred embodiment, the processing unit is further arranged for determining a total inclination between the lower end of the first form element and the upper end of the extension form element from the measured inclination of the first form element and the measured inclination of the extension form element. In this embodiment, the inclination of the framed formwork is calculated as a resultant of the inclination of the first form element and the inclination of the extension form element.

In another preferred embodiment, the processing unit is arranged for calculating a target tilt of the first form element, the processing unit further being arranged for determining a deviation between the actual tilt and the target tilt of the first form element. A variety of parameters may determine the target tilt. For example, the processing unit may calculate a target tilt of the first form element such that the upper end of the first form element is in a target horizontal position. Preferably, the target horizontal position of the upper end of the first form element is predetermined by a surveyor, in particular a geodesist, for the casting segment to be in conformity with a building plan.

This procedure may be repeated several times for casting a plurality of superimposed casting segments giving rise to a multilevel concrete structure.

In another preferred embodiment, the displaying device is arranged for displaying the deviation between the target tilt and the actual tilt of the first form element and/or that the signaling device is arranged for signaling the deviation between the target tilt and the actual tilt of the first form element. The displaying device may display information about the deviation of the first form element from its target position. This information can be used to adjust the inclination of the first form element. The signalling device may be arranged for outputting an acoustic or a visual signal.

In another preferred embodiment, the processing unit is connected to a data storage unit storing a correction value for a position of the first form element, the correction value being derived from a deviation between a position of a previous casting segment from a reference position of the previous casting segment, the processing unit being arranged for calculating the target tilt of the first form element using the correction value for the position of the first form element. As is known from the prior art, a multitude of correction values may be derived for individual sections of the casting segment to be casted. Each correction value reflects a deviation of a certain measuring point of the position of the previous casting segment as built, in particular at an upper end thereof, from its reference position, i.e. its intended position as shown in the construction plan. A number of techniques are known for obtaining measuring points of the previous casting segment as built for calculating the correction values therefrom. For example, laser plumb tools may be used. For this reason, detailed explanations thereof may be omitted in this disclosure.

In another preferred embodiment, a drive unit is provided for adjusting the first form element relative to the first support structure, the drive unit preferably comprising a first tilting unit for tilting the first form element and/or a first horizontal displacement unit for horizontally displacing the first form element and/or a first vertical displacement unit for vertically displacing the first form element.

In another preferred embodiment, the processing unit is connected to the first tilting unit for tilting the first form element in accordance with the target tilt. In this embodiment, the first form element may be adjusted by means of the first tilting unit, in particular by pivoting the first form element about a horizontal pivot axis.

A method for casting a concrete structure, in particular by successively casting a plurality of superimposed concrete segments, comprises the steps of
arranging a formwork having at least a first form element in a casting position, wherein the first form element delimits a cavity to receive concrete, in particular for forming an uppermost casting segment,
supporting the first form element in the casting position,
measuring the inclination of a lower region of a first longitudinal element extending from an upper region of the first form element to a lower region of the first form element,
measuring the inclination of an upper region of the first longitudinal element,
determining a deviation between the inclination of the lower region of the first longitudinal element and the upper region of the first longitudinal element.

In a preferred embodiment, the method further comprises the steps of:

comparing the deviation between the inclination of the lower region of the first longitudinal element and the upper region of the first longitudinal element to a threshold value.

Preferably, a warning signal and/or an interruption signal interrupting the adjustment of the inclination of the first form element is outputted if the deviation exceeds the threshold value.

In a preferred embodiment, the method further comprises the steps of
storing a correction value for a position of the first form element, the correction value being derived from a deviation between a position of a previous casting segment from a reference position of the previous casting segment,
calculating the target tilt of the first form element using the correction value for the position of the first form element.

In a preferred embodiment, the method further comprises at least one of
displaying the deviation between the target tilt and the actual tilt of the first form element,
signaling the deviation between the target tilt and the actual tilt of the first form element,
tilting the first form element in accordance with the target tilt by means of a drive unit.

In addition to the aspects, embodiments, and features described above, further aspects, embodiments, and features will become apparent by reference to the figures and the following detailed description.

BRIEF DESCRIPTION OF THE FIGURES

FIG. 2 is a side view of the first form element of the climbing formwork with a tilt sensor according to the present invention;

FIG. 3 shows detail A of FIG. 2;

FIG. 4 shows detail B of FIG. 2;

FIG. 5 is a front view of a framed formwork having an extension form element attached to the first form element according to another embodiment of the present invention;

FIG. 6 is a side view of the framed formwork of FIG. 5;

FIG. 7 shows detail C of FIG. 6; and

DETAILED DESCRIPTION

Figure 1:
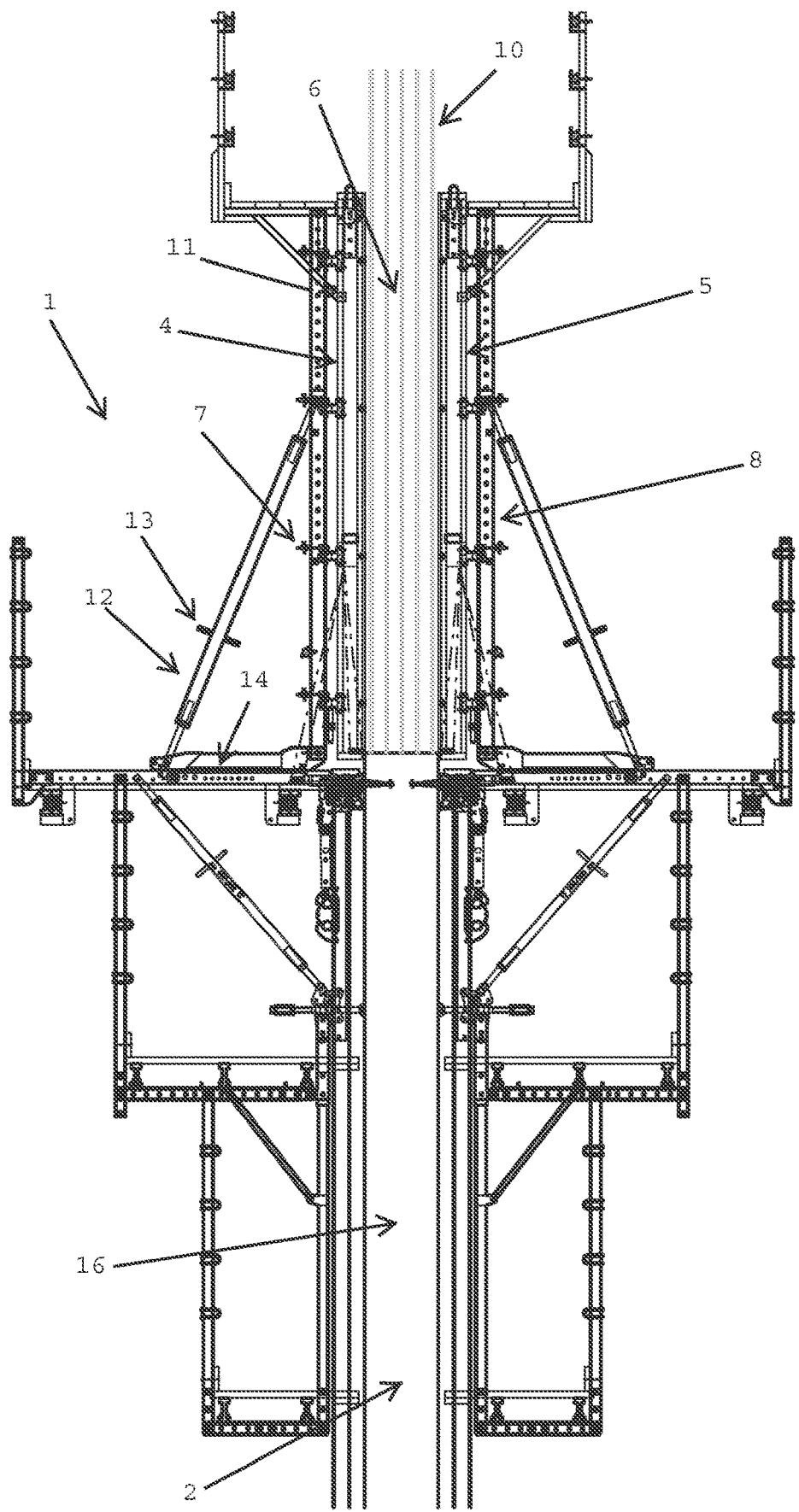
FIG. 1 is a schematic view of a climbing formwork for the progressive erection of a building structure having a first and second form element supported by a first and second support structure, respectively.

FIG. 1 shows a climbing formwork 1 for progressive erection of a concrete structure 2, for example a skyscraper. The concrete structure 2 is erected in a plurality of casting steps, in which a corresponding number of casting segments 3, each corresponding to a level of the concrete structure 2, are formed. For this purpose, the climbing formwork 1 comprises a first form element 4 and a second form element 5. Each of first 4 and second form element 5 comprises a formwork panel. In a casting position, the first 4 and second form element 5 define a cavity or space 6 therebetween to receive concrete for forming an uppermost casting segment. In detail, an outer surface of first form element 4 is facing the cavity 6, while an inner surface of first form element 4 is facing away from the cavity 6 for receiving concrete. As usual, reinforcements 10 are arranged in cavity 6 between first 4 and second form element 5 before casting of the uppermost casting segment. Reinforcements 10 project upwards of the upper end of first form element 4 and second form element 5. The climbing formwork 1 further comprises a first support structure 7 to support the first form element 4 and a second support structure 8 to support the second form element 5.

In the shown embodiment, a crane may be used to lift the climbing formwork 1 after completion of a casting step. However, as is well known in the prior art, the first support structure 7 may be connected to a first lifting device and the second support structure 8 may be connected to a second lifting device. The first and second lifting device are arranged for lifting the first 4 and second form element 5 in a vertical direction from a first casting position for forming a first casting segment to a second casting position for forming a second casting segment, the second casting segment being arranged on top of the first casting segment. In this way, an automatic or self-climbing formwork is provided.

The climbing formwork 1 will be explained with reference to the first form element 4 and the first support structure 7 (as shown on the left-hand side of FIG. 1). However, it will be understood that the description also applies to the second form element 5 and the second support structure 8 (as shown on the right-hand side of FIG. 1). In any case, the construction of first 7 and second support structure 8 of the shown climbing formwork 1 is conventional so that detailed explanations may be omitted.

The first support structure 7 comprises a support member 11, which is mounted on a drive unit 12 for adjusting the position and orientation of first form element 4 relative to the first support structure 7. In the shown embodiment, the drive unit 12 comprises a first tilting unit 13 for tilting the first form element 4. The tilting unit 13 permits the first form element 4 to be deployed in either of a vertical casting position and an inclined casting position. The tilt of the first form element 4 may reflect a correction value with respect to a previous casting segment 16. Furthermore, drive unit 12 comprises a first horizontal displacement unit 14 for moving the first form element 4 into position for casting. Furthermore, drive unit 12 may comprise a first vertical displacement unit for vertically displacing the first form element 4.

In the shown embodiment, the first support structure 7 comprises a working platform for supporting the first form element 4 from below. However, in an alternative embodiment, the first form element 4 is suspended from the first support structure 7. Such suspending formworks are known in the prior art.

The drive unit 12 may comprise any known drives. For example, tilting unit 13 may include a hydraulic plunger and cylinder for tilting first form element 4. Furthermore, horizontal displacement unit 14 may include a carriage mechanism for horizontally displacing first form element 4, as explained in WO 2011/127970. In a less preferred embodiment, the form element 4 is manually adjusted for arrangement in the casting position.

In the shown embodiment, climbing formwork 1 comprises a first tilt sensor 15, also termed inclinometer, for measuring an inclination of the main (vertical) plane of first form element 4 with respect to a vertical plane. A processing unit 18 (see FIG. 8) communicates with the first tilt sensor 15. The processing unit 18 is connected to a data storage unit 24 storing a multitude of correction values for the casting segment of the present casting step. The correction values for the casting segment are transformed into correction values for the position of the first form element 4 such that deviations of the previous casting segment 16 as built from the reference position as shown on the construction plan are compensated for in the present casting step. For the adjustment of the first form element 4, the processing unit 18 calculates the target tilt of the first form element 4 using the correction value for the position of the first form element 4.

Figure 8:
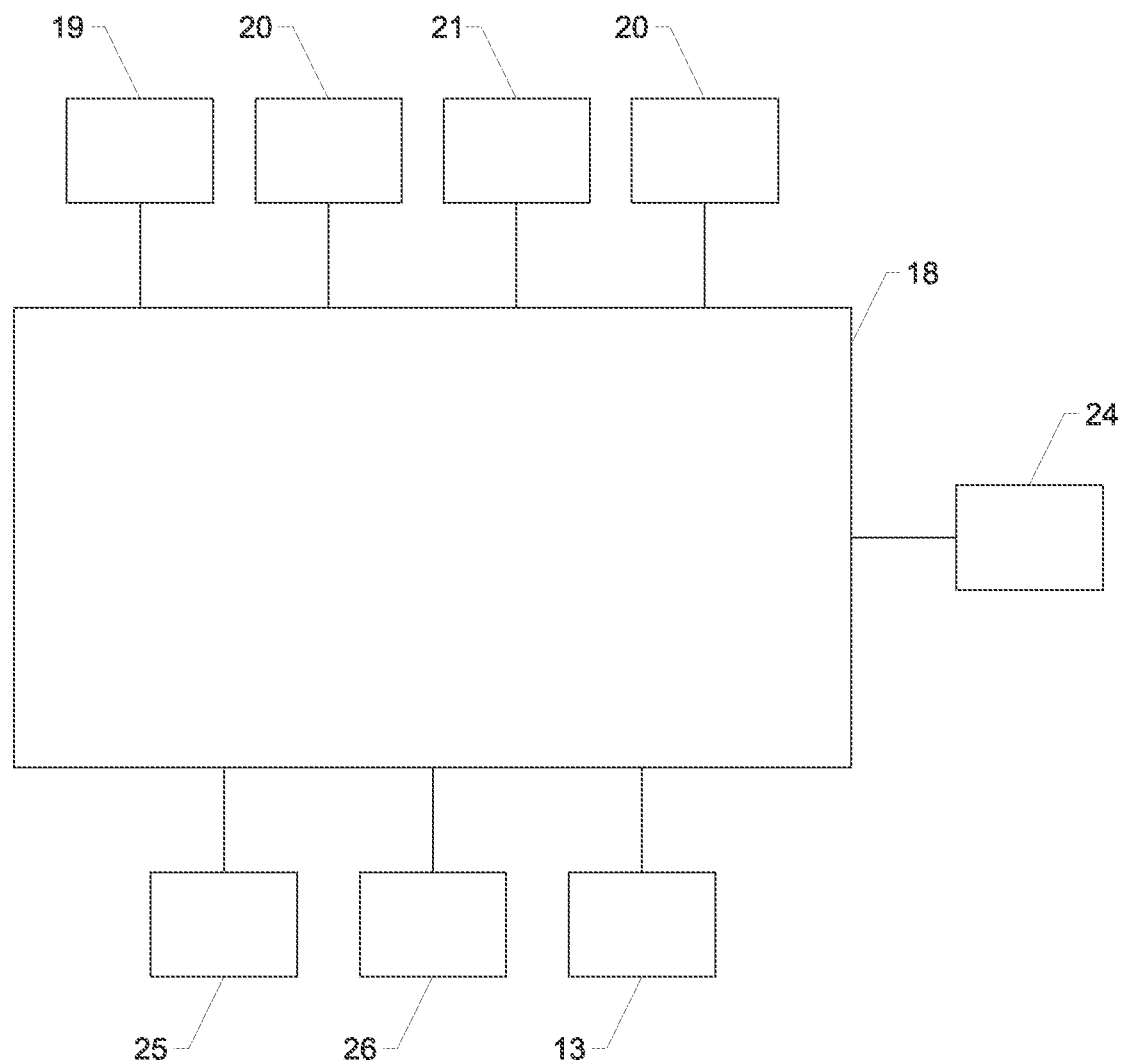
FIG. 8 is a function chart of the climbing formwork of FIGS. 1 to 7.

As can be schematically seen from FIG. 8, the processing unit 18 preferably is connected to a displaying device 25 for displaying the deviation between the target tilt and the actual tilt of the first form element 4. The processing unit 18 may also be connected to a signaling device 26 for signaling the deviation between the target tilt and the actual tilt of the first form element 4. Finally, the processing unit 18 preferably is connected to the first tilting unit 13 of the drive unit 12 for tilting the first form element 4 in accordance with the target tilt.

FIG. 2, FIG. 3 and FIG. 4 show the first form element 4 with a preferred embodiment of the tilt sensor 15. The tilt sensor 15 comprises a first longitudinal element 47 mounted on the first form element 4. The first longitudinal element 47 extends from the upper end of the first form element 4 to the lower end of the first form element 4. The first longitudinal element 47 has but two connections to the first form element 4, namely an upper connection 48 at the upper end and a lower connection 49 at the lower end of the first form element 4, respectively.

In the shown embodiment, the longitudinal element 47 is a (metal) wire/string 55. The tilt sensor 15 further comprises a tensioning device 56 for putting the wire or string 55 under tension. The lower end of the wire or string 55 is fixed to a first mount 57, the upper end of the wire or string 55 is fixed to a second mount 58. In the shown example, two tensioning devices 56 are provided, at the second mount 58 and at the first mount 57, respectively. Each of the tensioning devices 56 comprises an adjustment screw 56a for adjusting the tension of the wire or string 55. The lower connection 49 comprises a first bracket 50 attached to the first form element 4 at the lower end thereof, the first bracket 50 being connected to a first pivoting support 51. In this embodiment, the first pivoting support 51 is arranged for pivotably supporting the first mount 57 for the lower end of the wire or string 55. The upper connection 48 comprises a second bracket 52 attached to the first form element 4 at the upper end thereof, the second bracket 52 being connected to a second pivoting support 53. In this embodiment, the second pivoting support 53 is arranged for pivotably supporting the second mount 58 for the upper end of the wire or string 55. In the shown embodiment, the first pivoting support 51 and the second pivoting support 53 each have a pointed support, i.e. a tip, and a recess for the pointed support.

In the shown embodiment, the first tilt sensor 15 comprises a first sensor element 19 for measuring the inclination of a lower region 47a of the first longitudinal element 47 and a second sensor element 20 for measuring the inclination of an upper region 47b of the first longitudinal element 47. The processing unit 18 determines a deviation, i.e. a difference between the tilt angle of the lower region 47a of the first longitudinal element 47 and the upper region 47b of the first longitudinal element 47.

The displaying device 25 may further be arranged for displaying the deviation between the inclination of the lower end region 47a of the first longitudinal element 47 and the upper end region 47b of the first longitudinal element 47. Furthermore, the signaling device 25 may further be arranged for signaling the deviation between the inclination of the lower end region 47a of the first longitudinal element 47 and the upper end region 47b of the first longitudinal element 47. For example, if the deviation exceeds a threshold value stored in the data storage 24, at least one of the following responses is given:

d) The signaling device 25 gives an alarm, for example an acoustic or visual alarm.

e) The adjustment of the first form element 4, in particular by means of the tilting unit 13, is not permitted.

f) The displaying device shows the deviation measured by the first sensor element 19 and the second sensor element 20, respectively.

FIGS. 5 to 7 show another embodiment of the climbing formwork 1, in which an extension form element 59 is connected to the upper end of the first form element 4. The extension form element 59 extends upwards from the upper end of the first form element 4. In this embodiment, the first form element 4 and the extension form element 49 constitute the lower and upper part of a framed formwork, respectively, in particular made of metal or plastic material. The framed formwork is modular. Thus, the required dimensions of the framed formwork result from a suitable combination of the first form element 4 with the extension form element 59 (or further extension form elements).

In this embodiment, a second longitudinal element 60, preferably another wire/string 61, extends from an upper region of the extension form element 59 to a lower region of the extension form element 59. The second longitudinal element 60 has but two connections to the extension form element 4, namely an upper connection at the upper end and a lower connection at the lower end of the extension form element 59, respectively. The connections of the second longitudinal element 60 to the extension form element 59 is identical to the connections of the first longitudinal element 47 to the first form element 4 so that reference is made to the description above.

In this embodiment, the first tilt sensor 15 comprises a third sensor element 21 arranged for measuring the inclination (tilt angle) of a lower end region 60a of the second longitudinal element 60 and a fourth sensor element 22 for measuring the inclination of an upper end region 60b of the second longitudinal element 60 (see FIG. 8). The processing unit 18 is arranged for calculating a deviation between the inclination of the lower end region 60a of the second longitudinal element 60 and the upper end region 60b of the second longitudinal element 60.

Furthermore, the processing unit 18 is arranged for determining an overall (total) inclination (tilt) between the lower end of the first form element 4 and the upper end of the extension form element 59 from the measured inclination of the first form element 4 and the measured inclination of the extension form element 59.

The sensor elements 19 to 22 may have a conventional design. For example, without loss of generality, each of the electronic sensor elements 19 to 22 may be composed of a MEMS (Micro-Electro-Mechanical System) inclinometer that is capable of measuring gravitational forces that affect a microscopic spring-mass system on one or more sensor axes. The resulting displacement of the mass can be detected by position changes of electrodes attached to said sensor mass which results in changes in capacitance that are read out by on-chip electronics. It may be complemented by additional sensors like temperature sensor, magnetic sensor, barometer and an optional gyroscope for shock compensation. The barometer may be used for checking whether the sensor element 20 at the upper region of the first form element 4 is correctly arranged above the sensor element 19 at the lower region of the first form element 4 and whether the sensor element 22 at the upper region of the extension form element 4 is correctly arranged above the sensor element 21 at the lower region of the extension form element 4, respectively. A micro-controller inside the sensor element may be responsible for fetching the raw sensor readings and performing additional processing like temperature drift compensation, anti-shock filtering and finally acceleration to inclination conversion. The computed value is reported to the processing unit 18, displaying device 25 and/or signaling device 26. Besides data delivery, the algorithms in the sensor element 19 to 22 may provide functionality for self-test and self-checks and sensor element orientation to ensure the operational status of the device.

The tilt sensor 15 explained above may be used in different kinds of formworks, including shaft formworks, suspended formworks and framed formworks.

The invention claimed is:

1. A formwork for casting a concrete structure, the formwork comprising
at least a first form element for delimiting a cavity to receive concrete, the first form element having an upper end and a lower end,
a first tilt sensor for measuring an actual tilt of the first form element,
a processing unit communicating with the first tilt sensor, characterized in that
the first tilt sensor comprises a first longitudinal element mounted on the first form element, the first longitudinal element extending from an upper region of the first form element to a lower region of the first form element, the first longitudinal element being connected to the first form element at the upper region and at the lower region of the first form element, respectively,
the first tilt sensor further comprising a first sensor element for measuring the inclination of a lower region of the first longitudinal element and a second sensor element for measuring the inclination of an upper region of the first longitudinal element,
the processing unit further being arranged for determining a deviation between the inclination of the lower region of the first longitudinal element and the upper region of the first longitudinal element.

2. Formwork according to claim 1, characterized in that the first longitudinal element has only two connections to the first form element.

3. Formwork according to claim 1, characterized in that the processing unit is connected to at least one of
a displaying device for displaying the deviation between the inclination of the lower region of the first longitudinal element and the upper region of the first longitudinal element,
a signaling device for signaling the deviation between the inclination of the lower region of the first longitudinal element and the upper region of the first longitudinal element.

4. Formwork according to claim 1, characterized in that the first longitudinal element is connected to the first form element via a first pivoting support at the lower region of the first form element and a second pivoting support at the upper region of the first form element, respectively.

5. Formwork according to claim 4, characterized by
a first bracket attached to the first form element at the lower region thereof, the first bracket being connected to the first pivoting support for pivotably supporting the lower region of the first longitudinal element and/or
a second bracket attached to the first form element at the upper region thereof, the second bracket being connected to the second pivoting support for pivotably supporting the upper region of the first longitudinal element.

6. Formwork according to claim 1, characterized in that the first longitudinal element is a wire or string.

7. Formwork according to claim 6, characterized in that the tilt sensor further comprises a tensioning device for putting the wire or string under tension.

8. Formwork according to claim 1, characterized by
an extension form element connected to the upper end of the first form element and extending upwards therefrom,
a second longitudinal element extending from an upper region of the extension form element to a lower region of the extension form element, wherein
the tilt sensor further comprises a third sensor element arranged for measuring the inclination of a lower region of the second longitudinal element and a fourth sensor element for measuring the inclination of an upper region of the second longitudinal element,
the processing unit further being arranged for determining a deviation between the inclination of the lower region of the second longitudinal element and the upper region of the second longitudinal element.

9. Formwork according to claim 8, characterized in that the processing unit is further arranged for determining a total inclination between the lower end of the first form element and the upper end of the extension form element from a measured inclination of the first form element and a measured inclination of the extension form element.

10. Formwork according to claim 1, characterized in that the processing unit is arranged for calculating a target tilt of the first form element, the processing unit further being arranged for determining a deviation between the actual tilt and the target tilt of the first form element.

11. Formwork according to claim 3, characterized in that the displaying device is arranged for displaying the deviation between the target tilt and the actual tilt of the first form element and/or that the signaling device is arranged for signaling the deviation between the target tilt and the actual tilt of the first form element.

12. Formwork according to claim 1, characterized in that the processing unit is connected to a data storage unit storing a correction value for a position of the first form element, the correction value being derived from a deviation between a position of a previous casting segment from a reference position of the previous casting segment, the processing unit being arranged for calculating the target tilt of the first form element using the correction value for the position of the first form element.

13. Formwork according to claim 1, characterized by a drive unit for adjusting the first form element relative to a first support structure.

14. Formwork according to claim 13, characterized in that the processing unit is connected to the first tilting unit for tilting the first form element in accordance with a target tilt.

15. Formwork according to claim 1, wherein the formwork is a climbing formwork.

16. Formwork according to claim 2, wherein the two connections comprise an upper connection at the upper end and a lower connection at the lower end of the first form element, respectively.

17. Formwork according to claim 13, wherein the drive unit comprises a first tilting unit for tilting the first form element and/or a first horizontal displacement unit for horizontally displacing the first form element and/or a first vertical displacement unit for vertically displacing the first form element.

18. A method for casting a concrete structure comprising the steps of
arranging a formwork having at least a first form element in a casting position, wherein the first form element delimits a cavity to receive concrete,
wherein
measuring the inclination of a lower region of a first longitudinal element extending from an upper region of the first form element to a lower region of the first form element,
measuring the inclination of an upper region of the first longitudinal element,
determining a deviation between the inclination of the lower region of the first longitudinal element and the upper region of the first longitudinal element.

* * * * *